United States Patent
Akiyama

(10) Patent No.: US 10,634,983 B2
(45) Date of Patent: Apr. 28, 2020

(54) LIGHT SOURCE APPARATUS AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/170,604

(22) Filed: Oct. 25, 2018

(65) Prior Publication Data

US 2019/0129289 A1    May 2, 2019

(30) Foreign Application Priority Data

Oct. 26, 2017 (JP) .................... 2017-207380

(51) Int. Cl.
*G03B 21/20* (2006.01)
*G03B 21/00* (2006.01)

(52) U.S. Cl.
CPC ....... *G03B 21/208* (2013.01); *G03B 21/2013* (2013.01); *G03B 21/2033* (2013.01); *G03B 21/008* (2013.01)

(58) Field of Classification Search
CPC .. G03B 21/28; G03B 21/208; G03B 21/2013; G03B 21/2033; G03B 21/2053; G03B 21/2066; H04N 9/315; H04N 9/3152; H04N 9/3161; H04N 9/3164
See application file for complete search history.

(56) References Cited

U.S. PATENT DOCUMENTS

| 8,998,421 B2* | 4/2015 | Akiyama | G02B 27/283 353/20 |
| 2009/0219491 A1* | 9/2009 | Williams | G02B 27/0927 353/37 |
| 2010/0231862 A1* | 9/2010 | Itoh | G02B 27/0994 353/31 |
| 2011/0188003 A1* | 8/2011 | Furutachi | G03B 33/12 353/34 |
| 2012/0307349 A1* | 12/2012 | Arntsen | G02B 27/48 359/327 |

(Continued)

FOREIGN PATENT DOCUMENTS

| JP | 2014-59513 A | 4/2014 |
| JP | 2015-64444 A | 4/2015 |

*Primary Examiner* — Sultan Chowdhury
(74) *Attorney, Agent, or Firm* — Oliff PLC

(57) ABSTRACT

A light source apparatus includes a plurality of semiconductor lasers arranged on a substrate along a first direction, a rod integrator on which the plurality of light beams from the plurality of semiconductor lasers are incident, and a cylindrical lens so provided between the plurality of semiconductor lasers and the light incident end surface of the rod integrator as to cover the optical paths of the plurality of light beams. The plurality of semiconductor lasers include a first, second and third semiconductor laser. The center axis of each of the plurality of light beams intersects the first direction. A light emitting region of each of the semiconductor lasers has a lengthwise direction. The generatrix of the cylindrical lens is parallel to the lengthwise direction. First to third color light beams are combined with one another by the rod integrator, and the combined light exits out of the rod integrator.

8 Claims, 11 Drawing Sheets

(56) References Cited

U.S. PATENT DOCUMENTS

2016/0091784 A1* 3/2016 Hu .................... G03B 21/2013
    353/102
2016/0198135 A1* 7/2016 Kita .................. G03B 21/2033
    348/756
2016/0223887 A1   8/2016 Egawa et al.

* cited by examiner

LIGHT SOURCE APPARATUS AND PROJECTOR

BACKGROUND

1. Technical Field

The present invention relates to a light source apparatus and a projector.

2. Related Art

As a light source used in a projector, a semiconductor laser or any other laser light source capable of producing high-luminance, high-power light has received attention.

For example, JP-A-2015-64444 discloses a projector including a light source apparatus for red light including a laser light source for red light, a light source apparatus for green light including a laser light source for green light, a light source apparatus for blue light including a laser light source for blue light, light diffusers and light modulators provided in the optical paths of the color light beams, and a projection system.

JP-A-2014-59513 discloses a projector including a blue semiconductor laser, a red semiconductor laser, a phosphor plate that receives blue light from the blue semiconductor laser as excitation light and emits green fluorescence, a dichroic mirror unit, a micromirror device, and a projection lens section.

The laser-light-source-based projectors described in JP-A-2015-64444 and JP-A-2014-59513 each employs a configuration in which a plurality of semiconductor lasers that emit light beams having colors different from one another are arranged in separate positions and the light beams emitted from the semiconductor lasers are combined with one another by a light combining element. In the configuration described above, however, the light source apparatus are each large and the projector is in turn undesirably large.

SUMMARY

An advantage of some aspects of the invention is to provide a compact light source apparatus. Another advantage of some aspects of the invention is to provide a compact projector.

A light source apparatus according to an aspect of the invention includes at least one substrate, a plurality of semiconductor lasers arranged on the substrate along a first direction, a rod integrator having a light incident end surface on which a plurality of light beams emitted from the plurality of semiconductor lasers are incident and a light exiting end surface that is opposed to the light incident end surface, and at least one cylindrical lens so provided between the plurality of semiconductor lasers and the light incident end surface of the rod integrator as to cover optical paths of the plurality of light beams. The plurality of semiconductor lasers include a first semiconductor laser that emits first color light, a second semiconductor laser that emits second color light different from the first color light in terms of color, and a third semiconductor laser that emits third color light different from the first color light and the second color light in terms of color. A center axis of each of the plurality of light beams intersects the first direction. A light emitting region of each of the plurality of semiconductor lasers has a lengthwise direction. A generatrix of the cylindrical lens is parallel to the lengthwise direction. The first color light, the second color light, and the third color light are combined with one another by the rod integrator, and the combined light exits via the light exiting end surface.

In the light source apparatus according to the aspect of the invention, the plurality of semiconductor lasers, which include the first semiconductor laser, the second semiconductor laser, and the third semiconductor laser, which emit light beams having colors different from one another, are arranged on the single substrate. The plurality of light beams emitted from the first to third semiconductor lasers pass through the cylindrical lens and enter the rod integrator, and the rod integrator combines the plurality of light beams with one another and homogenizes the illuminance distribution thereof. As described above, since the plurality of semiconductor lasers, which emit light beams having colors different from one another, do not need to be disposed in positions separate from each other, the size of the light source apparatus can be reduced.

The semiconductor lasers each output light having an elliptical cross-section having a minor axis extending in the lengthwise direction of the light emitting region and a major axis extending in the widthwise direction of the light emitting region. That is, the light emitted from each of the semiconductor lasers has a divergence angle in a plane perpendicular to the lengthwise direction of the light emitting region and a divergence angle in a plane perpendicular to the widthwise direction of the light emitting region, and the former divergence angle is greater than the latter divergence angle. Therefore, after the light beams emitted from the semiconductor lasers pass through the rod integrator, some of the light beams do not enter an optical system provided on the downstream side of the rod integrator, undesirably resulting in a decrease in light use efficiency. Increasing the diameter of the downstream optical system so that the light beams entirely enter the optical system, however, results in an increase in the size of the light source apparatus.

In contrast, in the light source apparatus according to the aspect of the invention, the cylindrical lens is so provided that the generatrix of the cylindrical lens is parallel to the lengthwise direction of the light emitting regions and that the cylindrical lens covers the optical paths of the plurality of light beams between the plurality of semiconductor lasers and the light incident end surface of the rod integrator. According to the configuration described above, the light having exited out of the cylindrical lens has a small divergence angle in a plane perpendicular to the lengthwise direction of the light emitting regions as compared with the divergence angle of the light before incident on the cylindrical lens. As a result, light that does not enter the optical system on the downstream side of the rod integrator is unlikely to occur, whereby a compact light source apparatus can be achieved with a decrease in light use efficiency suppressed.

In the light source apparatus according to the aspect of the invention, the at least one substrate may include a first substrate and a second substrate. The at least one cylindrical lens may include a first cylindrical lens and a second cylindrical lens. The first substrate and the second substrate may be arranged along a second direction that intersects the first direction and the center axes. A plurality of the semiconductor lasers may be provided on each of the first and second substrates. The first cylindrical lens may be so disposed as to face the light emitting regions of the plurality of semiconductor lasers on the first substrate. The second cylindrical lens may be so disposed as to face the light emitting regions of the plurality of semiconductor lasers on the second substrate. Light having exited out of the first cylindrical lens and light having exited out of the second cylindrical lens may enter the rod integrator.

According to the configuration described above, since the plurality of substrates, on which the plurality of semiconductor lasers are arranged in the first direction, are arranged in the second direction, the plurality of semiconductor lasers can be two-dimensionally disposed in a plane perpendicular to the center axes. A larger number of semiconductor lasers can therefore be disposed in a limited space.

In the light source apparatus according to the aspect of the invention, the plurality of semiconductor lasers may each be so disposed that the lengthwise direction coincides with the first direction.

According to the configuration described above, since the direction of the generatrix of the cylindrical lens coincides with the first direction (direction in which plurality of semiconductor lasers are arranged), a small number of cylindrical lenses suffice, that is, the number of cylindrical lenses only needs to be equal to the number of substrates. The number of cylindrical lenses to be used can therefore be minimized, whereby the configuration of the light source apparatus can be simplified.

In the light source apparatus according to the aspect of the invention, it is desirable that in planes perpendicular to the first direction, $\alpha 1$ is greater than $\alpha 2$ and $\alpha 2$ is not zero degrees, where $\alpha 1$ (degrees) represents an angle of emergence of the light beams emitted from the semiconductor lasers, and $\alpha 2$ (degrees) represents an angle of emergence of the light beams having exited out of the cylindrical lens.

According to the configuration described above, the light beams having exited out of the cylindrical lens have a small angle of divergence in the planes perpendicular to the lengthwise direction of the light emitting regions, and the light beams are obliquely incident on the light incident end surface of the rod integrator, whereby the illuminance distribution of the light beams is homogenized.

A projector according to another aspect of the invention includes the light source apparatus according to the aspect of the invention, a light modulator that modulates light from the light source apparatus in accordance with image information to form image light, and a projection optical apparatus that projects the image light.

According to the configuration described above, a compact projector can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to FIGS. 1 to 7.

Figure 1:
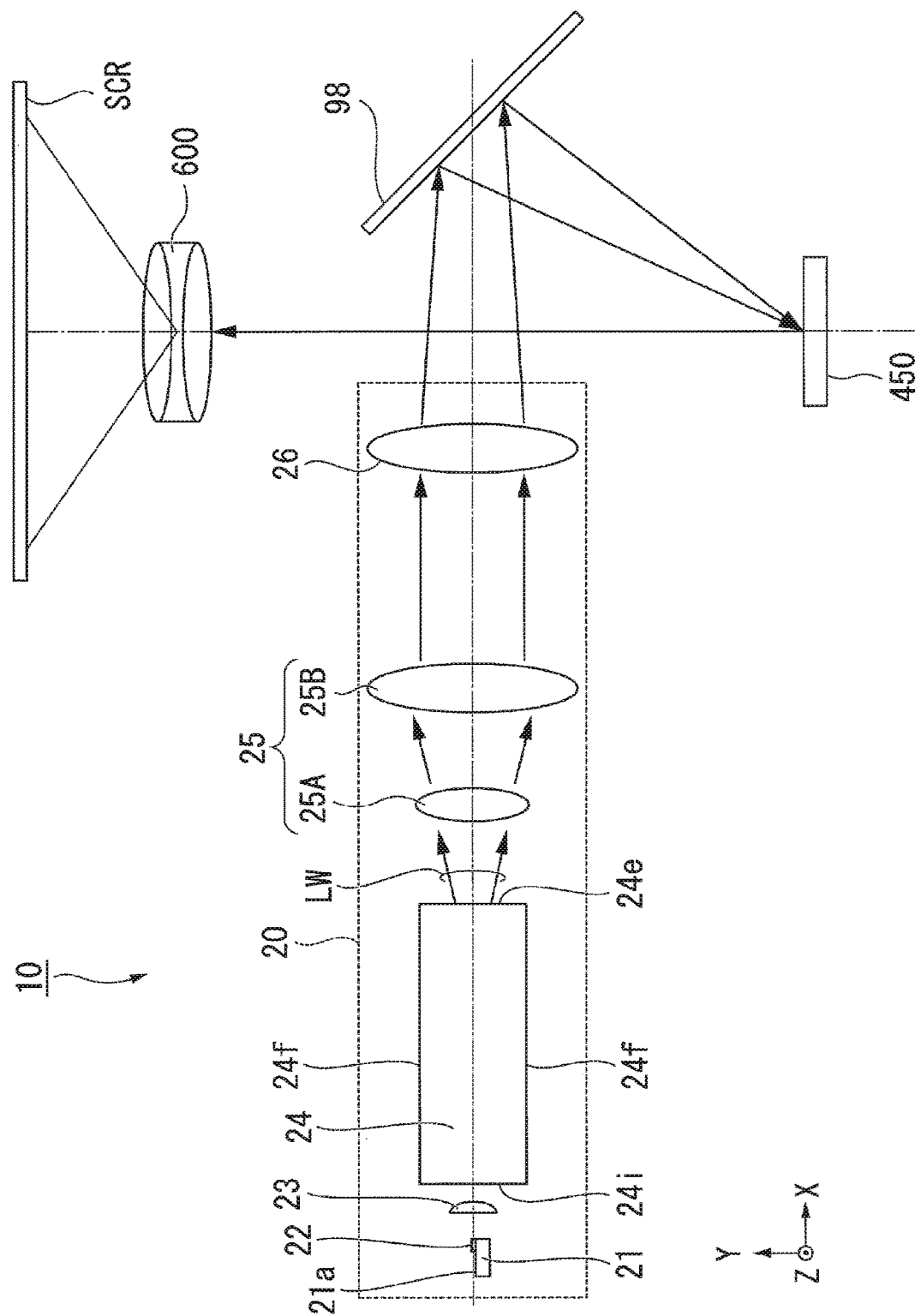
FIG. 1 is a schematic configuration diagram of a projector according to a first embodiment.

FIG. 1 is a schematic configuration diagram of a projector according to the first embodiment.

In the following drawings, each component is drawn at a different dimensional scale in some cases for clarity of the component. Further, in the following drawings, an XYZ orthogonal coordinate system is used, and the directions X, Y, and Z are defined as follows: The direction X is the direction in which light from a semiconductor laser travels; the direction Y is the direction in which light from a projection optical apparatus travels; and the direction Z is the direction perpendicular to the directions X and Y.

A projector 10 according to the present embodiment includes a light source apparatus 20, a light guide system 98, a micromirror-type light modulator 450, and a projection optical apparatus 600, as shown in FIG. 1. The light source apparatus 20 outputs red light R0, green light G0, and blue light B0 in a time division manner and causes the color light beams to be sequentially incident on the light modulator 450. The configuration of the light source apparatus 20 will be described later in detail.

The light guide system 98 is formed of a reflection mirror. The light guide system 98 reflects the red light R0, the green light G0, and the blue light B0 outputted from the light source apparatus 20 and causes the reflected light beams to be incident on the light modulator 450 in a time division manner.

The micromirror-type light modulator 450 is, for example, a digital micromirror device (DMD). A DMD has a configuration in which a plurality of micromirrors are arranged in a matrix. A DMD switches the direction in which the plurality of micromirrors incline from one direction to the other to quickly switch the direction in which light incident on the DMD is reflected between the direction in which the light enters the projection optical system 600 and the direction in which the light does not enter the projection optical system 600. The thus configured light modulator 450 sequentially modulates the red light R0, the green light G0, and the blue light B0 outputted from the light source apparatus 20 to produce a green image, a red image, and a blue image.

The projection optical system 600 projects the green image, the red image, and the blue image on a screen SCR. The projection optical system 600 is formed, for example, of a plurality of projection lenses.

Figure 2:
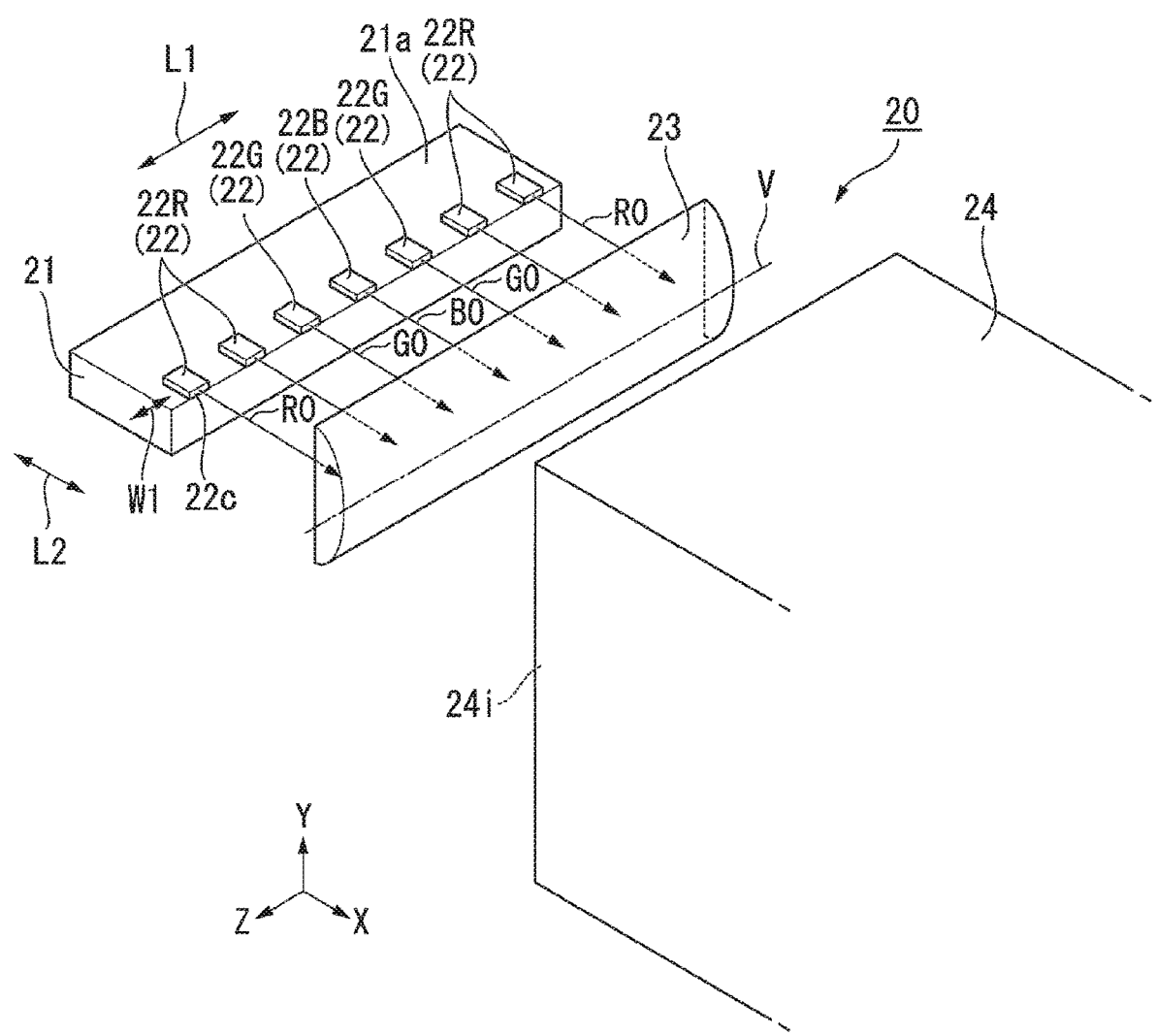
FIG. 2 is a perspective view of a light source apparatus according to the first embodiment.

The light source apparatus 20 includes a substrate 21, a plurality of semiconductor lasers 22, a cylindrical lens 23, a rod integrator 24, a pickup system 25, and a light collection system 26, as shown in FIGS. 1 and 2.

The substrate 21 is made of a metal material that excels in heat dissipation, for example, aluminum and copper. The substrate 21 has a mounting surface 21a, on which the plurality of semiconductor laser 22 are mounted. The mounting surface 21a has an oblong shape having a lengthwise direction L1 and a widthwise direction L2.

The plurality of semiconductor lasers 22 are arranged with a gap therebetween on the mounting surface 21a of the substrate 21 in a lengthwise direction L1 (first direction). The orientation of the center axis of the light emitted from each of the semiconductor lasers coincides with the widthwise direction L2, which intersects the lengthwise direction L1. In the following description, the plurality of light beams emitted from the plurality of semiconductor lasers are collectively referred to as a light ray flux.

The plurality of semiconductor lasers 22 include a blue semiconductor laser 22B (first semiconductor laser), which emits the blue light B0 (first color light), green semiconductor lasers 22G (second semiconductor laser), which emit the green light B0 (second color light), and red semiconductor lasers 22R (third semiconductor laser), which emit the red light R0 (third color light). In the present embodiment, seven semiconductor lasers 22 including one blue semiconductor laser 22B, two green semiconductor lasers 22G, and four red semiconductor lasers 22R are provided on the substrate 21. The number of semiconductor lasers 22 that emit light having each of the colors is not limited to the number described above and can be changed as appropriate.

In general, since the light emission efficiency of a semiconductor laser varies on an emitted light color basis, the optical output from a semiconductor laser also varies on an emitted light color basis. Further, to produce white light having desired luminance, the magnitude of required output varies on an emitted light color basis. The numbers of semiconductor lasers 22 that output color light beams necessary to produce white light having predetermined brightness therefore differ from one another as described above.

The one blue semiconductor laser 22B is disposed at the center of the seven semiconductor lasers 22. The two green semiconductor lasers 22G are disposed on opposite sides of the blue semiconductor laser 22B, one on each side. The four red semiconductor lasers 22R are disposed on opposite sides of the green semiconductor lasers 22G, two on each side. As an example, the blue semiconductor laser 22B emits light having a peak wavelength, at which the intensity of the emitted light peaks, in a wavelength range from about 380 to 495 nm. The green semiconductor lasers 22G each emit light having a peak wavelength in a wavelength range from about 495 to 585 nm. The red semiconductor lasers 22R each emit light having a peak wavelength in a wavelength range from about 585 to 720 nm.

Figure 3:
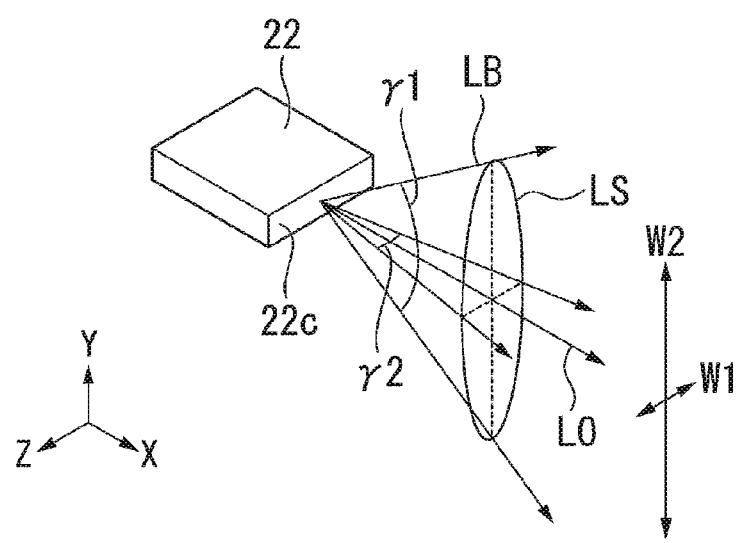
FIG. 3 is a perspective view of a semiconductor laser.

FIG. 3 is a perspective view of one of the semiconductor lasers 22. The blue semiconductor laser 22B, the green semiconductor lasers 22G, and the red semiconductor lasers 22R have the same configuration, and the blue semiconductor lasers 22B, the green semiconductor lasers 22G, and the red semiconductor lasers 22R are therefore collectively referred to as the semiconductor lasers 22 in the following description.

The semiconductor lasers 22 each have a light emitting region 22c, via which light is emitted, as shown in FIG. 3. The light emitting region 22c has an oblong planar shape having a lengthwise direction W1 and a widthwise direction W2 when viewed in the direction of a principal ray L0 of light LB emitted via the light emitting region 22c, as shown in FIG. 3. The ratio of the dimension of the light emitting region 22c in the lengthwise direction W1 to the dimension of the light emitting region 22c in the lengthwise direction W2 (W1/W2) is preferably at least 30/1. In the present embodiment, the dimension of the light emitting region 22c in the lengthwise direction W1 is, for example, 40 µm, and the dimension of the light emitting region 22c in the widthwise direction W2 is, for example, 1 µm. The shape and dimensions of the light emitting region 22c are not limited to those described above.

The semiconductor lasers 22 each output the light LB having an elliptical cross-section LS, which has a minor axis extending in the lengthwise direction W1 of the light emitting region 22c and a major axis extending in the widthwise direction W2 of the light emitting region 22c. That is, the light LB emitted from each of the semiconductor lasers 22 has a divergence angle γ1 in a plane perpendicular to the lengthwise direction W1 of the light emitting region 22c and a divergence angle γ2 in a plane perpendicular to the widthwise direction W2 of the light emitting region 22c, and the divergence angle γ1 is greater than the divergence angle γ2. The divergence angle γ1 of the light LB is, for example, 70° at the maximum (maximum radiation angle), and the divergence angle γ1 of the light LB is, for example, 20° at the maximum (maximum radiation angle). The plurality of semiconductor lasers 22 are each so disposed that the lengthwise direction W1 of the light emitting region 22c coincides with the lengthwise direction L1 of the substrate 21.

The cylindrical lens 23 is so provided as to cover the optical paths of the plurality of light beams B0, G0, and R0 and between the plurality of semiconductor lasers 22 and a light incident end surface 24i of the rod integrator 24, as shown in FIGS. 1 and 2. The plurality of light beams B0, G0, and R0 emitted from the plurality of semiconductor lasers 22 therefore pass through the cylindrical lens 23 and enter the rod integrator 24. The cylindrical lens 23 is formed of a planoconvex lens having a convex lens surface and a flat surface. The cylindrical lens 23 is so disposed that the direction of a generatrix V of the cylindrical lens 23 is parallel to the lengthwise direction W1 of the light emitting regions 22c of the semiconductor lasers 22.

The rod integrator 24 is provided on the optical paths of the plurality of light beams B0, G0, and R0 and between the cylindrical lens 23 and the pickup system 25. The rod integrator 24 is formed of a light transmissive member having a quadrangular columnar shape. The rod integrator 24 has a light incident end surface 24i, on which the plurality of light beams B0, G0, and R0 from the plurality of semiconductor lasers 22 are incident, a light exiting end surface 24e, which is opposed to the light incident end surface 24i, and four reflection surfaces 24f. The light incident end surface 24i and the light exiting end surface 24e have the same area, and two opposite reflection surfaces 24f are parallel to one another. That is, the rod integrator 24 in the present embodiment is formed of a non-tapered rod integrator.

The blue light B0, the green light G0, and the red light R0 are combined with one another by the rod integrator 24, and the combined light exits via the light exiting end surface 24e. The plurality of light beams including the blue light B0, the green light G0, and the red light R0 pass through the rod integrator 24, which homogenizes the intensity distribution of the plurality of light beams. The rod integrator 24 in the present embodiment is formed of a solid light transmissive member but may instead be formed of a hollow tubular member having an inner reflection surfaces.

In the present embodiment, since the plurality of semiconductor lasers 22 emit the blue light B0, the green light G0, and the red light R0 in a time division manner, only any one of the blue light B0, the green light G0, and the red light R0 is emitted in a period shorter than the light emission period of each of the semiconductor lasers 22. On the other hand, from the viewpoint of a period longer than the light emission period of each of the semiconductor lasers 22, the blue light B0, the green light G0, and the red light R0 are combined with one another by the rod integrator 24. The plurality of light beams B0, G0, and R0 combined with one another are hereinafter referred to as light LW.

The pickup system 25 is formed of a first convex lens 25A and a second convex lens 25B. The pickup system 25 roughly parallelizes the light LW having exited out of the rod integrator 24.

The light collection system 26 is formed of a convex lens. The light collection system 26 collects the light ray flux having exited out of the pickup system 26 and directs the collected light ray flux toward the light modulator 450.

An effect of the cylindrical lens 23 will be described with reference to FIGS. 4 and 5.

Figure 4:
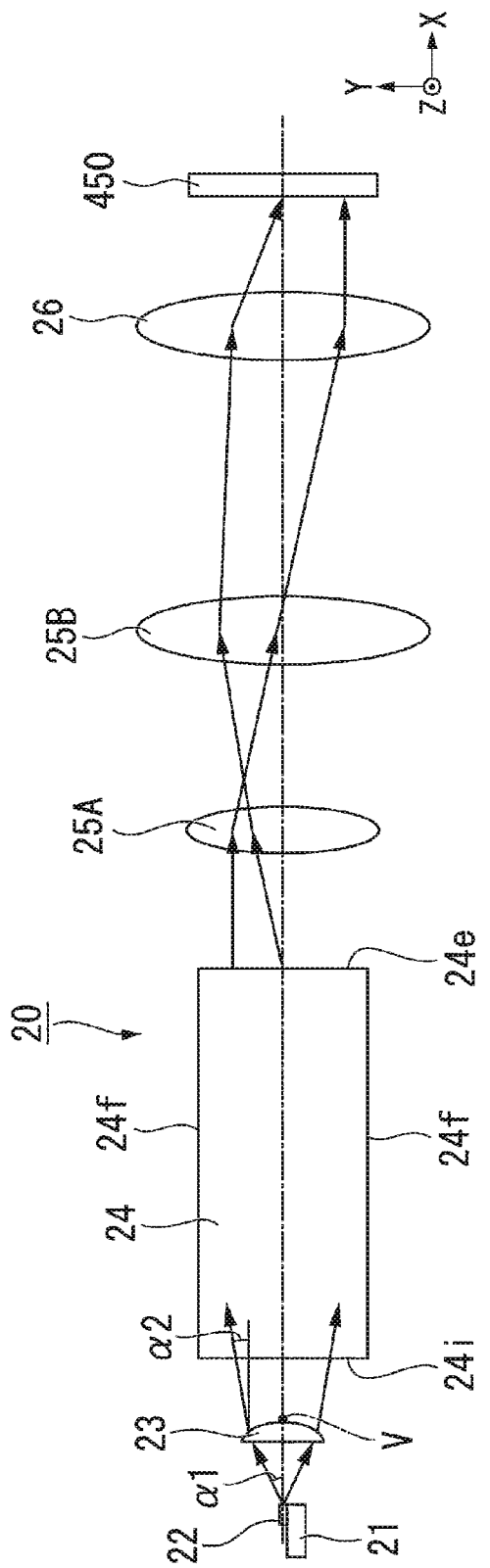
FIG. 4 is a plan view of the light source apparatus viewed in a +Z direction.

FIG. 4 is a plan view of the light source apparatus 20 viewed in the +Z direction. FIG. 5 is a side view of the light source apparatus 20 viewed in the +Y direction. In FIGS. 4 and 5, the light guide system 98 shown in FIG. 1 is omitted, and the optical paths of the light beams emitted from the semiconductor lasers 22 are drawn in the form of straight lines.

The cylindrical lens 23 has power only in the planes parallel to the XY plane, which is perpendicular to the generatrix V, as shown in FIG. 4. The power of the cylindrical lens 23 is so set as to be smaller than the power in a case where the cylindrical lens 23 is designed to completely parallelize the light beams B0, G0, and R0 in the planes parallel to the XY plane.

The thus configured cylindrical lens 23 refracts the light beams B0, G0, and R0 emitted from the plurality of semiconductor lasers 22 in XY planes. Specifically, in the planes parallel to the XY plane (planes perpendicular to lengthwise direction W1 of semiconductor lasers 22), let $\alpha 1$ (degrees) be the angle of emergence of the light beams B0, G0, and R0 emitted from the semiconductor lasers 22, and $\alpha 2$ (degrees) be the angle of emergence of the light beams B0, G0, and R0 having exited out of the cylindrical lens 23. The cylindrical lens 23 refracts the light beams B0, G0, and R0 in such a way that $\alpha 1$ is greater than $\alpha 2$ and $\alpha 2$ is not zero degrees. The angle of emergence $\alpha 1$ of the light beams B0, G0, and R0 in the planes parallel to the XY plane is half the divergence angle $\gamma 1$ described above and is therefore, for example, 35°.

If the angle of emergence $\alpha 2$ is zero degrees, light completely parallelized in the planes parallel to the XY plane enters the rod integrator 24. In this case, since no light is reflected off the reflection surfaces 24f of the rod integrator 24, the rod integrator 24 cannot perform the function of homogenizing the intensity distribution of the light passing through the rod integrator 24. The power of the cylindrical lens 23 therefore needs to be so set that $\alpha 2$ is not zero degrees.

Figure 5:
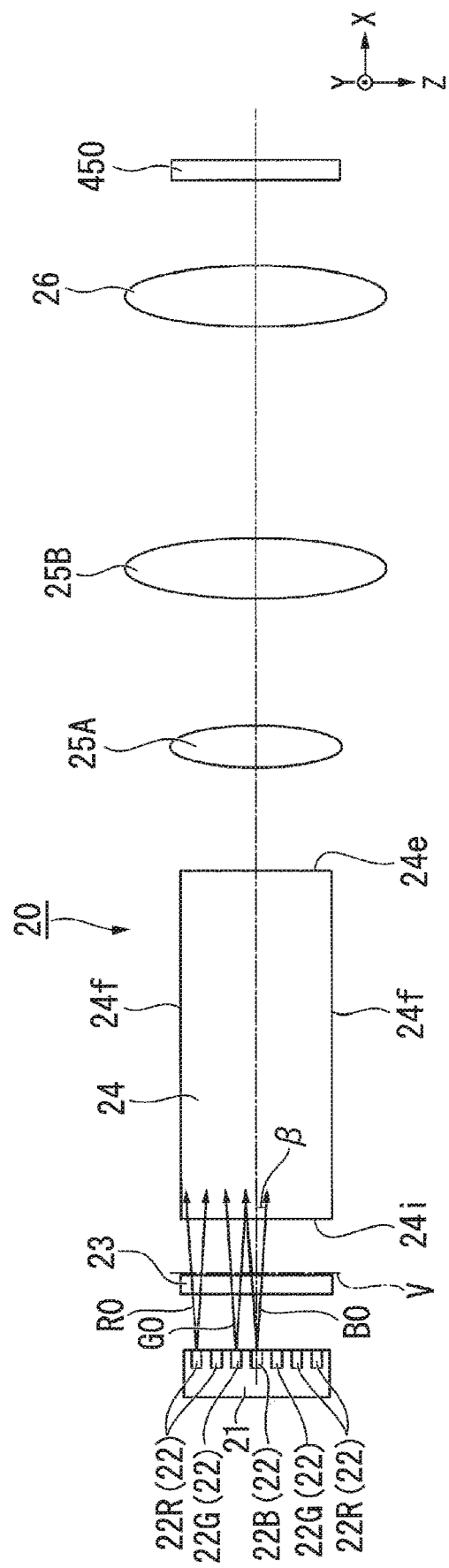
FIG. 5 is a side view of the light source apparatus viewed in a +Y direction.

On the other hand, the cylindrical lens 23 has no power in the XZ plane parallel to the generatrix V, as shown in FIG. 5. The light beams emitted from the semiconductor lasers 22 therefore pass through the cylindrical lens 23 with no change in the traveling direction of the light beams in the XZ plane, as shown in FIG. 5. Now, let β (degrees) be the angle of emergence of the light beams B0, G0, and R0 emitted from the semiconductor lasers 22 in the XZ plane, and the angle of emergence of the light beams B0, G0, and R0 having exited out of the cylindrical lens 23 remains equal to β (degrees). The angle of emergence β of the light beams B0, G0, and R0 in the planes parallel to the XZ plane is half the divergence angle $\gamma 1$ described above and is therefore, for example, 35°.

In the present embodiment, the power of the cylindrical lens 23 in the planes parallel to the XY plane is desirably so set that the light beams B0, G0, and R0 having passed through the cylindrical lens 23 have a roughly circular cross-sectional shape. That is, the power of the cylindrical lens 23 is desirably so set as to satisfy $\alpha 2 \approx \beta$. In this case, the cylindrical lens 23 converts the light beams B0, G0, and R0 having the elliptical cross-sectional shape shown in FIG. 3 into light beams having a roughly circular cross-sectional shape.

In the light source apparatus 20 according to the present embodiment, the plurality of semiconductor lasers 22, which include the blue semiconductor laser 22B, the green semiconductor lasers 22B, and the red semiconductor lasers 22R, which emit light beams having colors different from one another, are arranged on the single substrate 21. The plurality of light beams B0, G0, and R0 emitted from the plurality of semiconductor lasers 22 pass through the cylindrical lens 23 and enter the rod integrator 24, and the rod integrator 24 combines the light beams B0, G0, and R0 with one another and homogenizes the illuminance distribution thereof. As described above, since the plurality of semiconductor lasers 22, which emit light beams having colors different from one another, do not need to be disposed in positions separate from each other, the size of the light source apparatus 20 can be reduced.

Further, in the case where the rod integrator 24 is formed of a typical non-tapered rod integrator, the angular distribution of the light passing through the rod integrator 24 is preserved therein. That is, the light is incident on the light incident end surface 24i at an angle of incidence and exits via the light exiting end surface 24e at an angle of emergence equal to the angle of incidence. Therefore, in the case of a light source apparatus of related art having no cylindrical lens, the light beams from the semiconductor lasers exit out of the rod integrator at a large angle of emergence in the planes perpendicular to the lengthwise direction of the light emitting regions of the semiconductor lasers. As a result, some of the light beams do not enter the pickup system on the downstream side of the rod integrator, undesirably resulting in a decrease in light use efficiency. Increasing the diameter of the pickup system so that the light beams entirely enter the pickup system, however, undesirably results in an increase in the size of the light source apparatus.

In contrast, in the light source apparatus 20 according to the present embodiment, the cylindrical lens 23 is provided between the plurality of semiconductor lasers 22 and the rod integrator 24, and the angle of emergence $\alpha 2$ of the light beams having exited out of the cylindrical lens 23 is smaller than the angle of emergence $\alpha 1$ of the light beams emitted from the semiconductor lasers 22 in the planes parallel to the XY plane. As a result, the cross-sectional shape of the light having passed through the cylindrical lens 23 can be converted from the elliptical shape to a roughly circular shape. It is therefore unnecessary to use a large pickup system that allows incidence of the entire light beams having an elliptical cross-sectional shape. As a result, light that does not enter the pickup system is unlikely to occur as compared with related art, whereby a compact light source apparatus 20 can be achieved with a decrease in light use efficiency suppressed.

The size of the projector 10 according to the present embodiment, which includes the light source apparatus 20 described above, can also be reduced.

Second Embodiment

A second embodiment of the invention will be described below with reference to FIGS. 6 to 11.

The basic configurations of a projector and a light source apparatus according to the second embodiment are the same as those in the first embodiment and differ therefrom in terms of the arrangement of the plurality of semiconductor lasers. No overall description of the projector and the light source apparatus according to the second embodiment will therefore be made.

Figure 6:
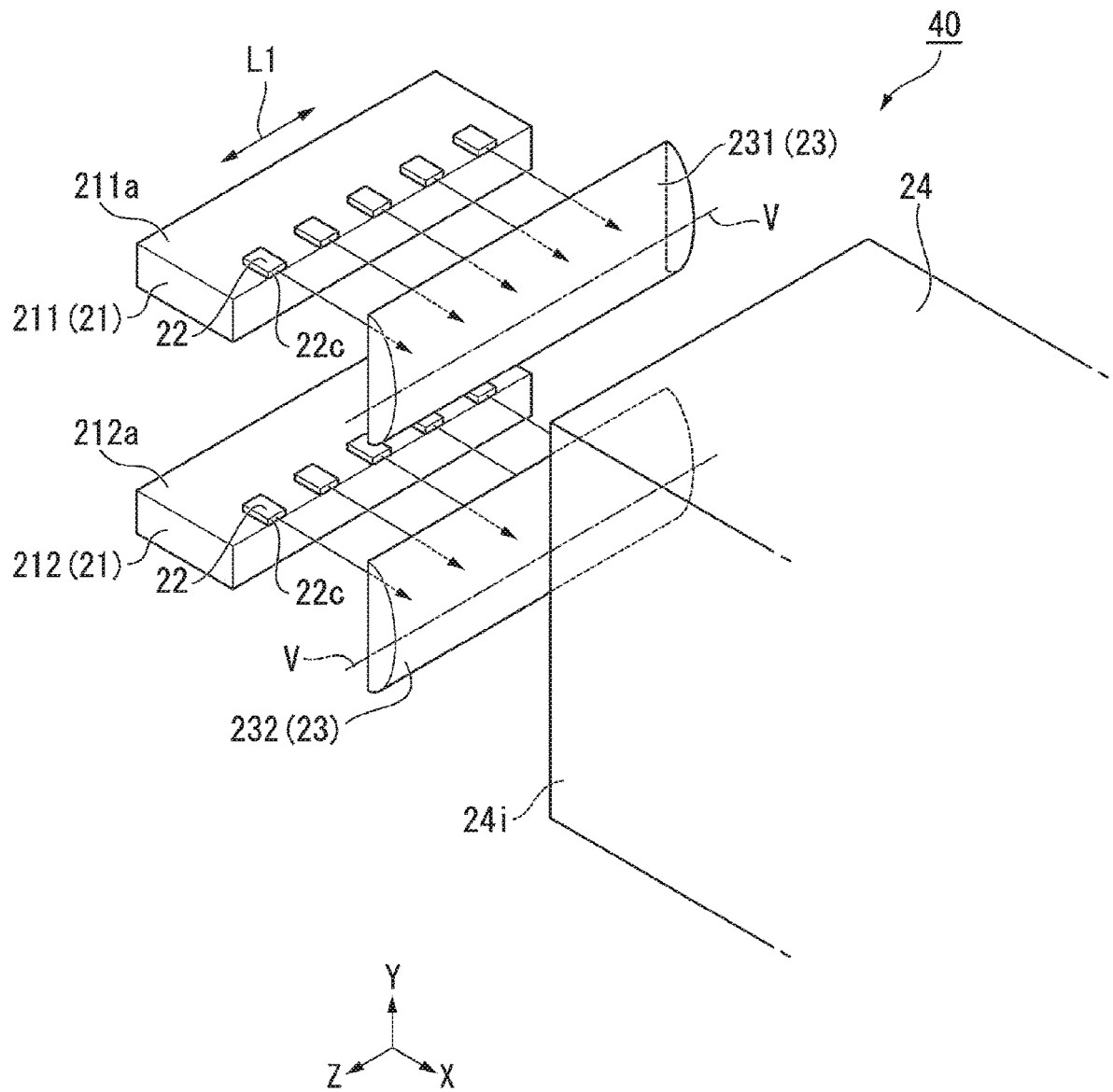
FIG. 6 is a perspective view of a light source apparatus according to a second embodiment.
Figure 7:
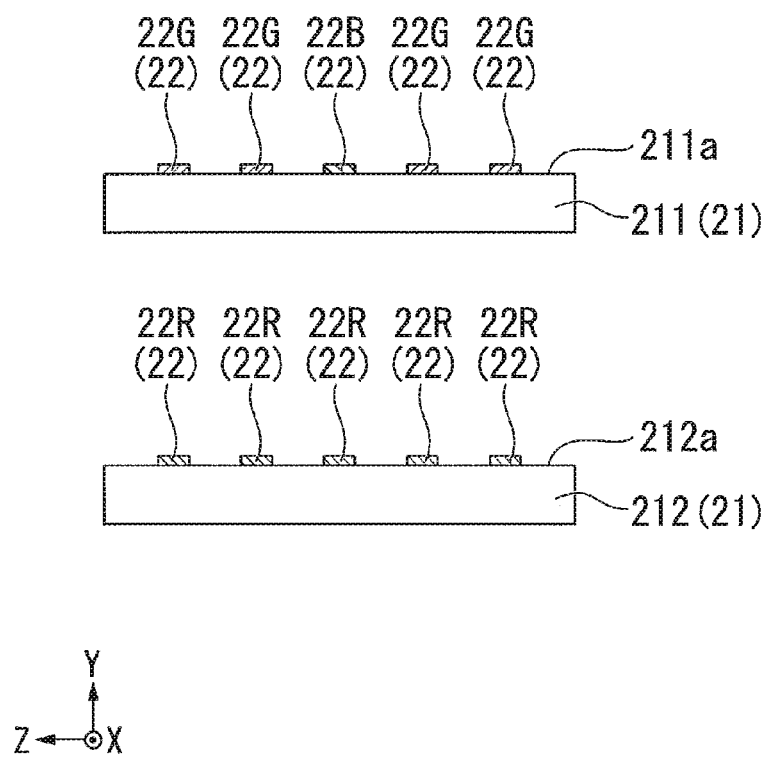
FIG. 7 is a front view of a plurality of semiconductor lasers viewed in a +X direction.

FIG. 6 is a perspective view of the light source apparatus according to the second embodiment. FIG. 7 is a front view of the plurality of semiconductor lasers viewed in the +X direction.

In FIGS. 6 to 11, components common to those in the drawings used in the first embodiment have the same reference characters and will not be described.

A light source apparatus 40 according to the present embodiment includes a plurality of substrates 21, a plurality of semiconductor lasers 22, a plurality of cylindrical lenses 23, a rod integrator 24, a pickup system 25 (see FIG. 1), and a light collection system 26 (see FIG. 1), as shown in FIGS. 6 and 7.

The plurality of substrates 21 are formed of a first substrate 211 and a second substrate 212. The plurality of semiconductor lasers 22 are provided on the first substrate 211 and the second substrate 212. The plurality of semiconductor lasers 22 are arranged with a gap therebetween on a mounting surface 211a of the first substrate 211 and a mounting surface 212a of the second substrate 212 in the lengthwise direction L1 (first direction). The first substrate 211 and the second substrate 212 are arranged in the direction perpendicular to the lengthwise direction L1 and the widthwise direction L2 (second direction that intersects first direction and center axis of light beams from semiconductor lasers). The number of substrates 21 is not limited to two described above and can be changed as appropriate.

Five semiconductor lasers 22 are provided on each of the first substrate 211 and the second substrate 212, as shown in FIG. 7. The five semiconductor lasers 22 on the first substrate 211 include one blue semiconductor laser 22B and four green semiconductor lasers 22G. The one blue semiconductor laser 22B is disposed at the center of the five semiconductor lasers 22. The four green semiconductor lasers 22G are disposed on opposite sides of the blue semiconductor laser 22B, two on each side. The five semiconductor lasers 22 on the second substrate 212 are each formed of a red semiconductor laser 22R. The number of semiconductor lasers 22 that emit light having each of the colors is not limited to the number described above and can be changed as appropriate.

The plurality of cylindrical lenses 23 are formed of a first cylindrical lens 231 and a second cylindrical lens 232, as shown in FIG. 6. The first cylindrical lens 231 is so disposed as to face the light emitting regions 22c of the plurality of semiconductor lasers 22 on the first substrate 211. The second cylindrical lens 232 is so disposed as to face the light emitting regions 22c of the plurality of semiconductor lasers 22 on the second substrate 212.

The plurality of light beams B0 and G0 emitted from the plurality of semiconductor lasers 22 on the first substrate 211 therefore enter the rod integrator 24 via the first cylindrical lens 231. The plurality of light beams R0 emitted from the plurality of semiconductor lasers 22 on the second substrate 212 therefore enter the rod integrator 24 via the second cylindrical lens 232. As described above, the light beams B0 and G0 having exited out of the first cylindrical lens 231 and the light beams R0 having exited out of the second cylindrical lens 232 enter the rod integrator 24.

The first cylindrical lens 231 and the second cylindrical lens 232 are each formed of a planoconvex lens having a convex lens surface and a flat surface, as in the first embodiment. The first cylindrical lens 231 and the second cylindrical lens 232 are each so disposed that the direction of a generatrix V of the corresponding cylindrical lens 23 is parallel to the lengthwise direction W1 of the light emitting regions 22c of the semiconductor lasers 22.

An effect of the cylindrical lenses 23 will be described with reference to FIGS. 8 and 9.

Figure 8:
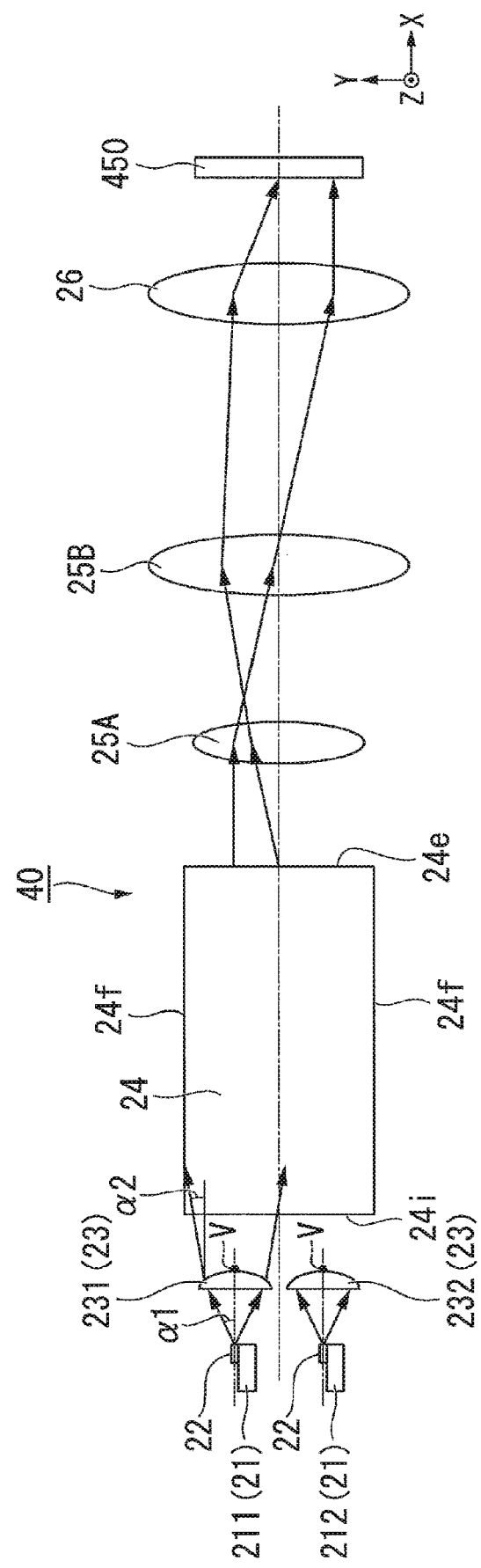
FIG. 8 is a plan view of the light source apparatus viewed in the +Z direction.

FIG. 8 is a plan view of the light source apparatus 40 viewed in the +Z direction. FIG. 9 is a side view of the light source apparatus 40 viewed in the +Y direction. In FIGS. 8 and 9, the light guide system 98 shown in FIG. 1 is omitted, and the optical paths of the light beams emitted from the semiconductor lasers 22 are drawn in the form of straight lines.

Figure 9:
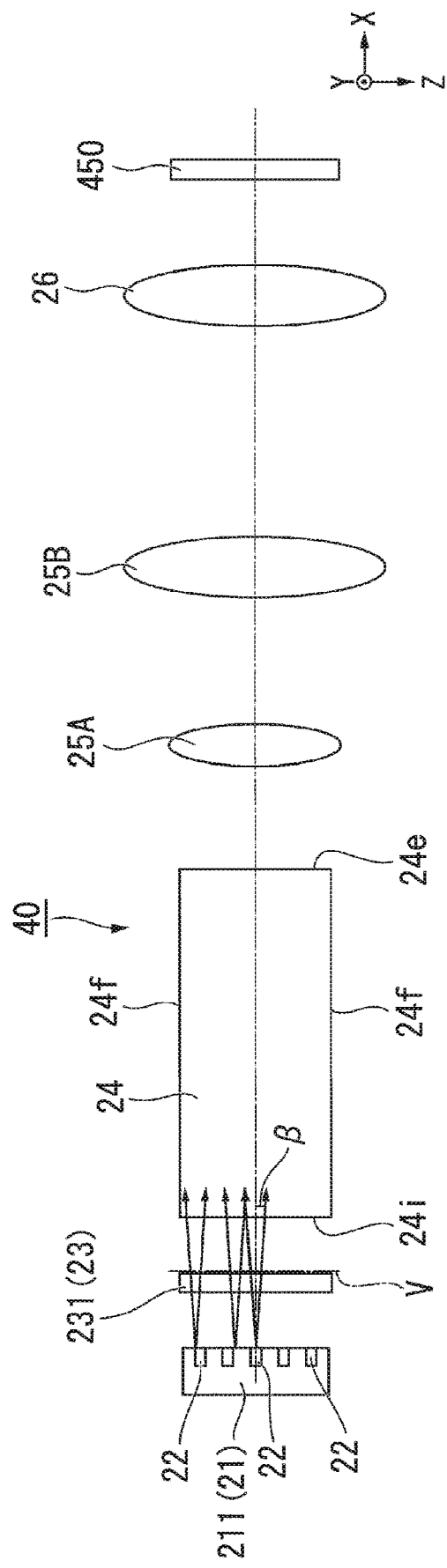
FIG. 9 is a side view of the light source apparatus viewed in the +Y direction.

The cylindrical lenses 23 each have power only in the planes parallel to the XY plane, which is perpendicular to the generatrix V, as shown in FIGS. 8 and 9. The power of the cylindrical lenses 23 is so set as to be smaller than the power in the case where the cylindrical lenses 23 are designed to completely parallelize the light beams from the semiconductor lasers in the planes parallel to the XY plane.

The cylindrical lens 23 refracts the light beams emitted from the plurality of semiconductor lasers 22 in the planes parallel to the XY plane in such away that $\alpha 1$ is greater than $\alpha 2$ and $\alpha 2$ is not zero degrees, as in the first embodiment. The cylindrical lenses 23 each do not refract light but simply transmit light in the planes parallel to the XZ plane, which is parallel to the generatrix V.

In the present embodiment, the light beams from the plurality of semiconductor lasers 22 on the first substrate 211 are incident on the one-side (upper side in FIG. 8) region of the light incident end surface 24i of the rod integrator 24, and the light beams from the plurality of semiconductor lasers 22 on the second substrate 212 are incident on the other-side (lower side in FIG. 8) region of the light incident end surface 24i of the rod integrator 24. Even in this case, the light beams are repeatedly reflected in the rod integrator 24, and light having homogenized illuminance exits via the light exiting end surface 24e.

Also in the present embodiment, a compact light source apparatus 40 can be achieved with a decrease in light use efficiency suppressed, and a compact projector can be achieved. That is, the same advantageous effects as those provided by the first embodiment can be provided.

In the present embodiment, since the first substrate 211 and the second substrate 212, on which the plurality of semiconductor lasers 22 are arranged, are arranged in the direction perpendicular to the direction in which the semiconductor lasers 22 are arranged, the plurality of semiconductor lasers 22 can be two-dimensionally disposed in a plane perpendicular to the center axis of the exiting light beams. A larger number of semiconductor lasers 22 can therefore be disposed in a limited space.

In the present embodiment, the plurality of semiconductor lasers 22 are each so disposed that the lengthwise direction W1 of the light emitting region 22c coincides with the lengthwise direction L1 of the substrates 21 (direction in which plurality of semiconductor lasers 22 are arranged). Therefore, even in the configuration in which five semiconductor lasers 22 are provided on each of the first substrate 211 and the second substrate 212, two cylindrical lenses 23 suffice, that is, the number of cylindrical lenses 23 only needs to be equal to the number of substrates 21. The number of cylindrical lenses 23 to be used can therefore be minimized, whereby the configuration of the light source apparatus 40 can be simplified.

A typical semiconductor laser requires cooling, and the amount of required cooling varies in accordance with the color of the light emitted from the semiconductor laser. Therefore, in a case where the semiconductor lasers 22 that emit light beams having the three colors are mixed with one another on each of the first substrate 211 and the second substrate 212, it is difficult to appropriately cool each of the substrates. In contrast, in the light source apparatus 40 according to the present embodiment, in which the first substrate 211 is provided with the blue semiconductor laser 22B and the green semiconductor lasers 22G and the second substrate 212 is provided only with the red semiconductor lasers 22R, the substrates can each be appropriately cooled.

The present inventor has conducted a simulation in order to demonstrate the effect of the cylindrical lenses 23 in the light source apparatus 40 according to the present embodiment.

The light source apparatus 40 according to the present embodiment including the cylindrical lenses 23 and a light source apparatus of related art including no cylindrical lens have been compared with each other in terms of the angular distribution of the light at the light exiting end surface of the rod integrator.

Figure 10:
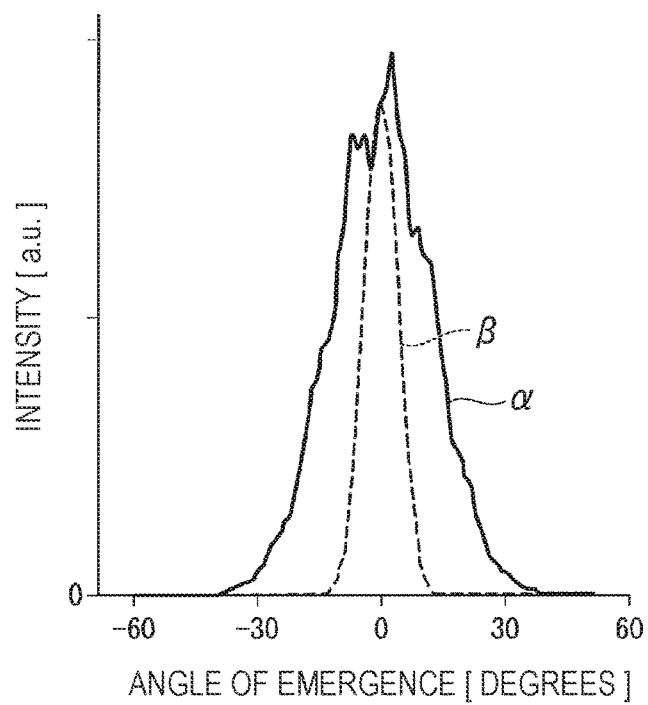
FIG. 10 shows the intensity distribution of light at a light exiting end surface of a rod integrator in a light source apparatus of related art.
Figure 11:
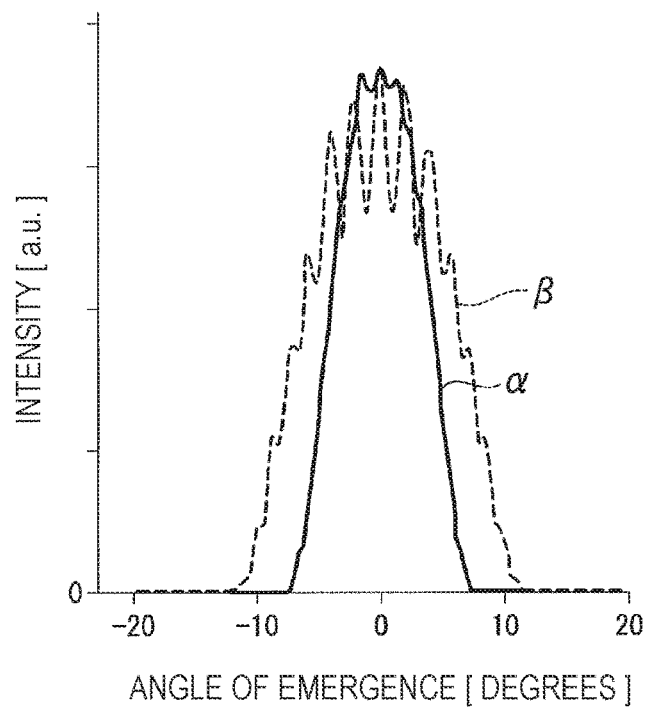
FIG. 11 shows the intensity distribution of light at a light exiting end surface of a rod integrator in the light source apparatus according to the second embodiment.

FIG. 10 shows the intensity distribution of the light at the light exiting end surface of the rod integrator in the light source apparatus of related art. FIG. 11 shows the intensity distribution of the light at the light exiting end surface of the rod integrator in the light source apparatus according to the present embodiment.

In FIGS. 10 and 11, the horizontal axis represents the angle of emergence [degrees], and the vertical axis represents the intensity [a.u.]. The graph labeled with the reference character α (solid line) represents the relationship between the angle of emergence and the intensity in a plane parallel to the XY plane, and the graph labeled with the reference character β (broken line) represents the relationship between the angle of emergence and the intensity in a plane parallel to the XZ plane.

In the light source apparatus of related art including no cylindrical lens, the angle of emergence α in the plane parallel to the XY plane has values over a range from −40 degrees to +40 degrees, and the angle of emergence β in the plane parallel to the XZ plane has values over a range from −15 degrees to +15 degrees, as shown in FIG. 10. In this case, for example, it is difficult for the light component that exits at the angle of emergence of −40 degrees in the plane parallel to the XY plane to enter the pickup system, which is located on the downstream side of the rod integrator, in the plane parallel to the XY plane.

In contrast, in the light source apparatus 40 according to the present embodiment, the angle of emergence α in the plane parallel to the XY plane has values over a range from −8 degrees to +8 degrees, and the angle of emergence β in the plane parallel to the XZ plane has values over a range from −12 degrees to +12 degrees, as shown in FIG. 11. As described above, the light source apparatus 40 according to the present embodiment, which includes the cylindrical lenses 23, allows the angle of emergence in the plane parallel to the XY plane to decrease to values roughly equal to the values of the angle of emergence in the plane parallel to the XZ plane. According to the simulation, the absolute values of the angles of emergence α and β described above are each smaller than or equal to 12 degrees, and the optical f number of the light exiting end surface 24e of the rod integrator 24 is greater than or equal to 2.4. An increase in size of the optical system on the downstream side of the rod integrator 24 can thus be suppressed.

Third Embodiment

A third embodiment of the invention will be described below with reference to FIG. 12.

A projector according to the third embodiment differs from the projector according to the first embodiment in that light crystal panels are used as the light modulator.

Figure 12:
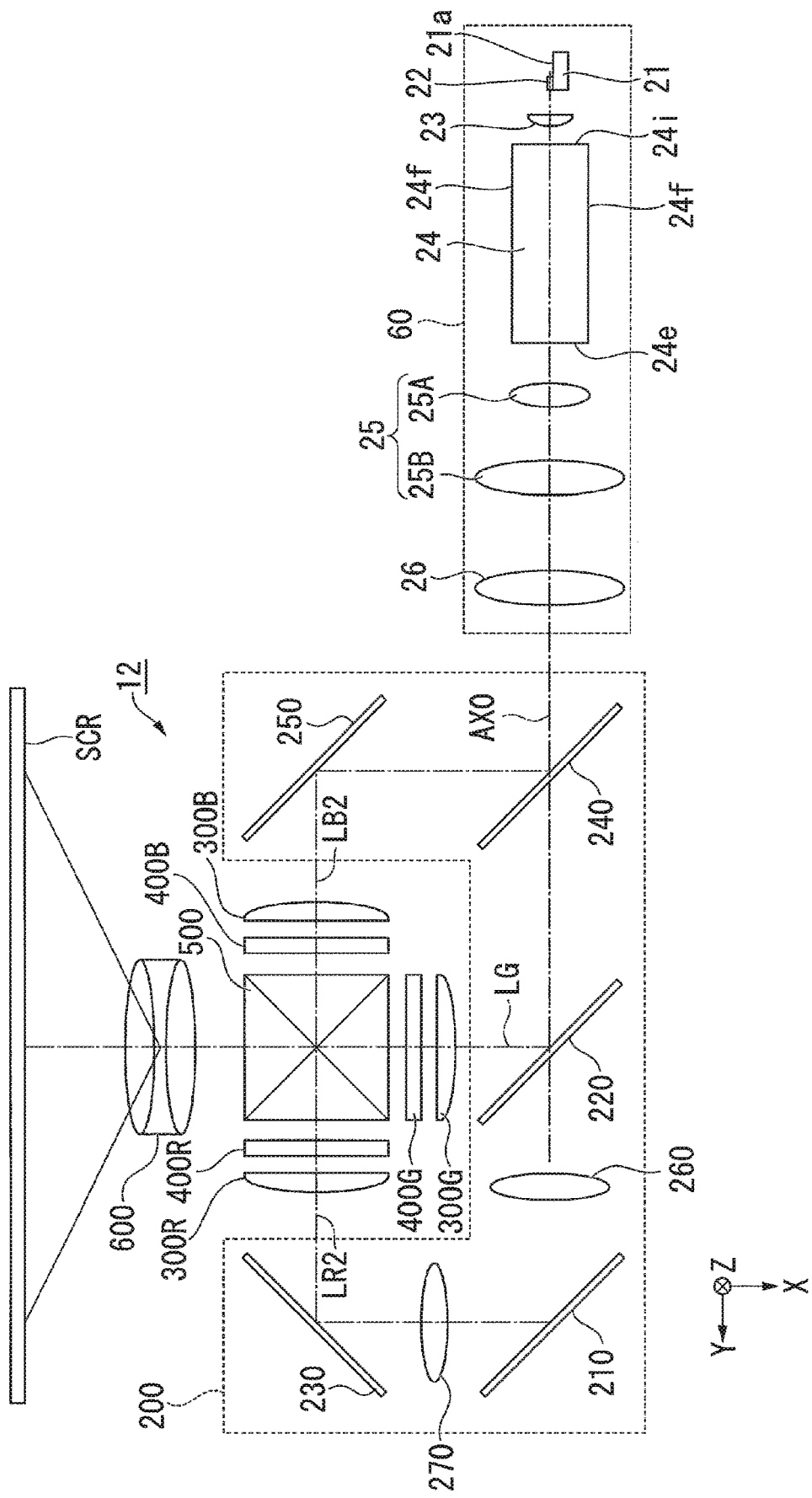
FIG. 12 is a schematic configuration diagram of a projector according to a third embodiment.

FIG. 12 is a schematic configuration diagram of the projector according to the third embodiment.

In FIG. 12, components common to those in the drawings used in the first embodiment have the same reference characters and will not be described.

A projector 12 according to the present embodiment includes a light source apparatus 60, a color separation/light guide system 200, a light modulator for red light 400R, a light modulator for green light 400G, a light modulator for blue light 400B, a light combining system 500, a projection optical apparatus 600, as shown in FIG. 12.

The configuration of the light source apparatus 60 according to the present embodiment is the same as the configuration of the light source apparatus 20 according to the first embodiment. In the light source apparatus 20 according to the first embodiment, however, the blue semiconductor laser 22B, the green semiconductor lasers 22G, and the red semiconductor lasers 22R sequentially emit light in a time division manner. In contact, in the light source apparatus 60 according to the present embodiment, the blue semiconductor laser 22B, the green semiconductor lasers 22G, and the red semiconductor lasers 22R simultaneously emit light.

The positional relationship between the semiconductor lasers 22 and the rod integrator 24 is so set that the polarization direction of the light emitted from each of the semiconductor lasers 22 is parallel or perpendicular to an arbitrary edge of the light incidence end surface 24i of the rod integrator 24. According to the configuration described above, the polarization direction of the light incident on the rod integrator 24 is preserved when and after the light exits out of the rod integrator 24. In this case, light-incidence-side polarizers that will be described later can be omitted, and the configuration described above is suitable for the present embodiment, in which liquid crystal panels are used as the light modulator. In the first embodiment, a DMD is used as the light modulator, and no linearly polarized light is used for display. The polarization direction of the light therefore does not need to be parallel or perpendicular to an arbitrary edge of the light incidence end surface 24i of the rod integrator 24.

The light modulator for red light 400R, the light modulator for green light 400G, the light modulator for blue light 400B modulate the light from the light source apparatus 60 in accordance with image information to form image light. The projection optical apparatus 600 projects the image light.

The color separation/light guide system 200 includes a dichroic mirror 240, a dichroic mirror 220, a reflection mirror 210, reflection mirror 230, reflection mirror 250, a relay lens 260, and a relay lens 270. The color separation/ light guide system 200 separates white light outputted from the light source apparatus 60 into red light LR2, green light LG2, and blue light LB2 and guides the red light LR2, the green light LG2, and the blue light LB2 to the corresponding light modulator for red light 400R, light modulator for green light 400G, and light modulator for blue light 400B, respectively.

A field lens 300R is disposed between the color separation/light guide system 200 and the light modulator for red light 400R. A field lens 300G is disposed between the color separation/light guide system 200 and the light modulator for green light 400G. A field lens 300B is disposed between the color separation/light guide system 200 and the light modulator for blue light 400B.

The dichroic mirror 240 reflects the blue light LB2 and transmits the red light LR2 and the green light LG2. The dichroic mirror 220 reflects the green light LG2 and transmits the red light LR2. The reflection mirrors 210 and 230 reflect the red light LR2. The reflection mirror 250 reflects the blue light LB2. The relay lenses 260 and 270 are provided on the optical path of the red light LR2.

The light modulator for red light 400R, the light modulator for green light 400G, and the light modulator for blue light 400B are each formed of a liquid crystal panel that modulates the color light flux incident thereon in accordance with image information to produce image light.

Although not shown, a light-incident-side polarizer is disposed between the light modulator for red light 400R and the field lens 300R. The same holds true for the light modulator for green light 400G and the light modulator for blue light 400B. A light-exiting-side polarizer is disposed between the light modulator for red light 400R and the light combining system 500. The same holds true for the light modulator for green light 400G and the light modulator for blue light 400B.

The light combining system 500 combines the image light fluxes outputted from the light modulator for red light 400R, the light modulator for green light 400G, and the light modulator for blue light 400B with one another. The light combining system 500 is formed of a cross dichroic prism formed by bonding four rectangular prisms to each other and therefore having a roughly square shape in a plan view. Dielectric multilayer films are provided along the roughly X-letter-shaped interfaces between the bonded rectangular prisms.

The image light having exited out of the light combining system 500 is enlarged and projected by the optical projection apparatus 600 on the screen SCR.

Also in the present embodiment, a compact light source apparatus 60 can be achieved with a decrease in light use efficiency suppressed, and a compact projector 12 can be achieved. That is, the same advantageous effects as those provided by the first embodiment can be provided.

The technical scope of the invention is not limited to the embodiments described above, and a variety of changes can be made thereto to the extent that the changes do not depart from the substance of the invention.

For example, the light source apparatus according to the embodiments described above each use a cylindrical lens having power in a plane parallel to the XY plane, which is perpendicular to the generatrix V, but having no power in a plane parallel to the XZ plane, which contains the generatrix V. The cylindrical lens may be replaced with an anamorphic lens, such as a toric lens having power not only in a plane parallel to the XY plane but in a plane parallel to the XZ plane. The power in a plane parallel to the XZ plane is desirably sufficiently smaller than the power in a plane parallel to the XY plane.

The above-mentioned configuration will be described based on comparison between FIGS. 4 and 5. For example, in the case where a toric lens is used, the light having passed through the toric lens is refracted not only in a plane parallel to the XY plane (see FIG. 4) but in a plane parallel to the XZ plane (see FIG. 5). In a plane parallel to the XZ plane, let $\beta 1$ (degrees) be the angle of emergence of the light emitted from one of the semiconductor lasers and $\beta 2$ (degrees) be the angle of emergence of the light having exited out of the toric lens, and the toric lens refracts the light in such a way that $\beta 1$ is greater than $\beta 2$ and $\beta 2$ is not zero degrees. In this case, setting the power in the above-mentioned plane of the toric lens in such a way that $\alpha 2$ is roughly equal to $\beta 2$ allows the light having exited out of the toric lens to have a roughly circular cross-sectional shape.

In the embodiments described above, the plurality of semiconductor lasers are so disposed that the lengthwise direction of the light emitting regions coincides with the direction in which the plurality of semiconductor lasers are arranged. The widthwise direction of the light emitting regions may instead be oriented in the direction in which the plurality of semiconductor lasers are arranged. In this case, cylindrical lenses may be so provided that the number of cylindrical lenses is equal to the number of semiconductor lasers provided on the substrate.

The number, the arrangement, the shape, the material, the dimensions, and other factors of each component of the light source apparatus and the projector shown in the embodiments described above can be changed as appropriate.

In the embodiments described above, the case where the light source apparatus according to each of the embodiments of the invention is used in a projector is presented by way of example, but not necessarily. The light source apparatus according to each of the embodiments of the invention may be used as a headlight of an automobile or any other lighting apparatus.

The entire disclosure of Japanese Patent Application No. 2017-207380, filed on Oct. 26, 2017 is expressly incorporated by reference herein.

What is claimed is:

1. A light source apparatus comprising:
   at least one substrate;
   a plurality of semiconductor lasers arranged on the substrate along a first direction;
   a rod integrator having a light incident end surface on which a plurality of light beams emitted from the plurality of semiconductor lasers are incident and a light exiting end surface opposing to the light incident end surface; and
   at least one cylindrical lens so provided between the plurality of semiconductor lasers and the light incident end surface of the rod integrator as to cover optical paths of the plurality of light beams,
   wherein:
      the plurality of semiconductor lasers include a first semiconductor laser that emits first color light, a second semiconductor laser that emits second color light different from the first color light in terms of color, and a third semiconductor laser that emits third color light different from the first color light and the second color light in terms of color,
      a center axis of each of the plurality of light beams intersects the first direction, a light emitting region of each of the plurality of semiconductor lasers has a lengthwise direction, a generatrix of the cylindrical lens is parallel to the lengthwise direction, and the first color light, the second color light, and the third color light are combined with one another by the rod integrator, and the combined light exits via the light exiting end surface, and wherein:

the at least one substrate includes a first substrate and a second substrate, the at least one cylindrical lens includes a first cylindrical lens and a second cylindrical lens, the first substrate and the second substrate are arranged along a second direction that intersects the first direction and the center axes, a plurality of the semiconductor lasers are provided on each of the first and second substrates, the first cylindrical lens is so disposed as to face the light emitting regions of the plurality of semiconductor lasers on the first substrate, the second cylindrical lens is so disposed as to face the light emitting regions of the plurality of semiconductor lasers on the second substrate, and light having exited out of the first cylindrical lens and light having exited out of the second cylindrical lens enter the rod integrator.

2. The light source apparatus according to claim 1, wherein the plurality of semiconductor lasers are each so disposed that the lengthwise direction coincides with the first direction.

3. A projector comprising:

the light source apparatus according to claim 2;

a light modulator that modulates light from the light source apparatus in accordance with image information to form image light; and a projection optical apparatus that projects the image light.

4. A projector comprising:

the light source apparatus according to claim 1;

a light modulator that modulates light from the light source apparatus in accordance with image information to form image light; and a projection optical apparatus that projects the image light.

5. The light source apparatus according to claim 1, wherein in planes perpendicular to the first direction, $\alpha 1$ is greater than $\alpha 2$ and $\alpha 2$ is not zero degrees, where $\alpha 1$ (degrees) represents an angle of emergence of the light beams emitted from the semiconductor lasers, and $\alpha 2$ (degrees) represents an angle of emergence of the light beams having exited out of the cylindrical lens.

6. A projector comprising:

the light source apparatus according to claim 5;

a light modulator that modulates light from the light source apparatus in accordance with image information to form image light; and a projection optical apparatus that projects the image light.

7. A light source apparatus comprising:

at least one substrate;

a plurality of semiconductor lasers arranged on the substrate along a first direction;

a rod integrator having a light incident end surface on which a plurality of light beams emitted from the plurality of semiconductor lasers are incident and a light exiting end surface opposing to the light incident end surface; and at least one cylindrical lens so provided between the plurality of semiconductor lasers and the light incident end surface of the rod integrator as to cover optical paths of the plurality of light beams, wherein:

the plurality of semiconductor lasers include a first semiconductor laser that emits first color light, a second semiconductor laser that emits second color light different from the first color light in terms of color, and a third semiconductor laser that emits third color light different from the first color light and the second color light in terms of color, a center axis of each of the plurality of light beams intersects the first direction, a light emitting region of each of the plurality of semiconductor lasers has a lengthwise direction, a generatrix of the cylindrical lens is parallel to the lengthwise direction, the first color light, the second color light, and the third color light are combined with one another by the rod integrator, and the combined light exits via the light exiting end surface, and in planes perpendicular to the first direction, $\alpha 1$ is greater than $\alpha 2$ and $\alpha 2$ is not zero degrees, where $\alpha 1$ (degrees) represents an angle of emergence of the light beams emitted from the semiconductor lasers, and $\alpha 2$ (degrees) represents an angle of emergence of the light beams having exited out of the cylindrical lens.

8. A projector comprising:

the light source apparatus according to claim 7;

a light modulator that modulates light from the light source apparatus in accordance with image information to form image light; and a projection optical apparatus that projects the image light.

* * * * *